United States Patent
Zock et al.

(10) Patent No.: US 10,603,608 B2
(45) Date of Patent: Mar. 31, 2020

(54) SECONDARY TUBULAR COMPOSITE FILTER SOCK SEAM FILLING DEVICE AND METHOD OF USING SAME AND COMPOSITE FILTER SOCK ASSEMBLY INCORPORATING A SEAM FILLING DEVICE

(71) Applicant: MKB Company, LLC, Groveport, OH (US)

(72) Inventors: Michael A. Zock, Saxonburg, PA (US); Nelson Peachey, Groveport, OH (US)

(73) Assignee: MKB Company, Groveport, OH (US)

( * ) Notice: Subject to any disclaimer, the term of this patent is extended or adjusted under 35 U.S.C. 154(b) by 50 days.

(21) Appl. No.: 15/989,247

(22) Filed: May 25, 2018

(65) Prior Publication Data

US 2018/0272254 A1    Sep. 27, 2018

Related U.S. Application Data

(60) Provisional application No. 62/511,340, filed on May 25, 2017.

(51) Int. Cl.
| | |
|---|---|
| *E02B 3/12* | (2006.01) |
| *B01D 24/04* | (2006.01) |
| *B01D 24/00* | (2006.01) |
| *C02F 1/00* | (2006.01) |
| *E02D 17/20* | (2006.01) |
| *E02B 3/10* | (2006.01) |
| *C02F 103/00* | (2006.01) |

(52) U.S. Cl.
CPC ......... *B01D 24/042* (2013.01); *B01D 24/001* (2013.01); *B01D 24/007* (2013.01); *C02F 1/004* (2013.01); *E02B 3/108* (2013.01); *E02B 3/122* (2013.01); *E02B 3/123* (2013.01); *E02B 3/125* (2013.01); *E02D 17/202* (2013.01); *B01D 2201/0423* (2013.01); *C02F 2103/001* (2013.01)

(58) Field of Classification Search
CPC . E02B 3/04; E02B 3/108; E02B 3/122; E02B 3/125; B01D 24/001; B01D 24/007; B01D 24/042; E02D 17/202
USPC .......... 210/170.03, 747.3; 405/16, 19, 302.4, 405/302.6
See application file for complete search history.

(56) References Cited

U.S. PATENT DOCUMENTS

| | | |
|---|---|---|
| 2,071,779 A | 2/1937 | Willing |
| 2,201,279 A | 5/1940 | Willing |
| 3,617,566 A | 11/1971 | Oshima et al. |
| 3,739,913 A | 6/1973 | Bogosian |
| 3,957,098 A | 5/1976 | Hepworth et al. |

(Continued)

*Primary Examiner* — Christopher Upton
(74) *Attorney, Agent, or Firm* — Blynn L. Shideler; Krisanne Shideler; BLK Law Group

(57) ABSTRACT

A Composite Filter Sock Assembly includes a Compost Filter Sock and Secondary Tubular Seam Filling Device configured to be wedged beneath the compost filter sock, whereby the compost filter sock provides a pinning pressure to the Secondary Tubular Seam Filling Device and wherein the compost filter sock has a nominal diameter of 2-12 times a diameter of a tubular element of the Secondary Tubular Seam Filling Device. The Tubular Element may be least partially filled with a swell-able material such as sphagnum peat moss and may include a fastening mechanism on an exterior surface configured to facilitate coupling to a mesh tube of a compost filter sock.

4 Claims, 2 Drawing Sheets

(56) References Cited

U.S. PATENT DOCUMENTS

| | | | |
|---|---|---|---|
| 4,366,067 A | 12/1982 | Golding et al. | |
| 4,659,478 A | 4/1987 | Stapelfeld et al. | |
| 6,337,025 B1* | 1/2002 | Clemenson | B01J 20/22 |
| | | | 210/170.03 |
| 7,357,598 B1* | 4/2008 | Bradley | E02B 3/108 |
| | | | 405/19 |
| 7,449,105 B2* | 11/2008 | Hastings | E02D 29/0291 |
| | | | 210/170.03 |
| 2002/0131826 A1* | 9/2002 | Spangler | E02B 3/04 |
| | | | 405/302.4 |
| 2004/0079699 A1* | 4/2004 | Engwer | E02B 3/125 |
| | | | 210/170.03 |
| 2004/0101368 A1* | 5/2004 | Daigle | E02D 17/202 |
| | | | 405/19 |
| 2005/0254899 A1* | 11/2005 | Tyler | E02B 3/125 |
| | | | 405/302.6 |
| 2006/0032804 A1* | 2/2006 | McPhillips | E02B 3/125 |
| | | | 210/205 |
| 2009/0266767 A1* | 10/2009 | McInnis | E02B 3/108 |
| | | | 210/170.03 |
| 2015/0047298 A1 | 2/2015 | Szebalskie, Sr. et al. | |
| 2016/0279541 A1 | 9/2016 | Zock et al. | |

\* cited by examiner

SECONDARY TUBULAR COMPOSITE FILTER SOCK SEAM FILLING DEVICE AND METHOD OF USING SAME AND COMPOSITE FILTER SOCK ASSEMBLY INCORPORATING A SEAM FILLING DEVICE

RELATED APPLICATIONS

This application claims priority to U.S. Patent Application Ser. No. 62/511,340 filed May 25, 2017 entitled "Secondary Tubular Composite Filter Sock Seam Filling Device and Method of Using Same and Composite Filter Sock Installation Assembly Incorporating a Seam Filling Device" which is incorporated herein by reference.

BACKGROUND INFORMATION

1. Field of the Invention

The present invention relates to erosion control compost filter socks and more particularly to a secondary tubular composite filter sock seam filling device and method of using same and composite filter sock assembly incorporating a seam filling device.

2. Background Information

A compost filter sock (also called a compost filter sleeve, or silt sleeve, or filter sock, compost filter tube, compost mesh sleeve, or similer terms) is a type of contained compost filter berm. A compost filter sock is a mesh tube or netting sleeve filled with mostly biodegradable material, often called compost material, and that is conventionally placed perpendicular to sheet-flow runoff to control erosion and retain sediment in disturbed areas.

The reference to the material within the sleeve as "compost material" has been used inconsistently in the art as this terminology has been used to define a material that has already undergone a certain amount of composting prior to being placed in the tube or sleeve, and alternatively this phrase has described a biodegradable aspect of the material after it has entered the sleeve or tube. The latter often seems to be more accurate as the industry often utilizes freshly chipped or ground wood products as "compost material" without any designated pre-filling composting time. The industry also utilizes biodegradable products that actually have undergone some composting prior to being uses as a filler in a compost filter sock.

In an effort to avoid such confusion, as used herein, the phrase "compost material" associated with compost filter sock will suggest material that has, or which can be composted or is biodegradable material, which will include both materials that has been pre-composted and compostable materials.

The idea of a filter sock formed as a mesh tube filled with compost material as the filler goes, at least, as far back as 1935 in early compost filter sock U.S. Pat. Nos. 2,079,779 and 2,201,279, which are incorporated herein by reference, and which disclose the use of brush or bundled weeds (which can also be called straw) as the compost filler in mesh containment.

Over the years improvements have been developed giving further detail to filler material, opening size in the sleeve or mesh, length and size of filters, installation instructions. See, for example U.S. Pat. Nos. 3,617,566, 3,739,913, 3,957,098, 4,366,067, and 4,659,478, Within the last 30 years, tubular compost filter socks filled with fibrous filler (e.g. straw such as switch grass or other straw like materials) or chipped or ground woody filler have been introduced. Some of the people doing work early in the evolution and proliferation and re-introduction of modern compost filter sock were John Engwer at FilterMitt, Kevin Lane at Lane ECS, Tom Truelsen at Soil Tek, Rod Tyler at Filtrexx, Keith and Kevin Weaver at Weaver Express, and Doug Cadwell at River Valley Organics. Soon a "modern day" tubular mesh fabric holding in place the berm material was introduced and the term "Compost Filter Sock" began to be used in the art. For a more detailed background on compost filter socks in general see U.S. Patent Publications 2016-0279541 and 2015-0047298, which are incorporated herein by reference.

Commonly the mesh is a circular (occasionally oval) shaped tube and the size of the mesh is given by the nominal diameter of the tube. The most common sizes of mesh of compost filter sock are 12", 18" and 24" nominal diameter. The nominal diameter is the preinstalled effective circular diameter of the mesh, as when the compost filter sock is installed the mesh will sag to a typical oval or D shape. Compost filter socks using tubes that have an original D-shape or oval shape have been proposed, but none are believed to be commercially available as the advantages to date, if any at all, of the known specialized shapes have been far outweighed by the additional cost of manufacturing.

For compost filter sock sizes generally 12" and above the upstream or upslope side of the compost filter sock includes additional filter media at the base that is typically called edging or seam filling. The edging or seam filling is often blown in or hand placed, which can be time consuming.

A more significant drawback in addition to installation time is that the edging or seam filling is often washed laterally along the compost filter sock with runoff water, or sometimes the compost filter media sock can be moved between the stakes away from the edging or seam filing filter media. Thus the seam filling can be moved from the sock and/or the sock can be moved from the seam filling. In both circumstances the maintenance of the compost filter sock requires a re-edging or seam filling to replace displaced media. This subsequent maintenance is time consuming, and if not attended to then the efficacy of the filter sock is degraded.

There remains a need in the art for an edging or seam filling device for compost filter socks which overcomes these existing deficiencies.

SUMMARY OF THE INVENTION

One aspect of this invention is directed to a composite filter sock assembly comprising a compost filter sock and a secondary tubular seam filling device. The composite filter sock installation assembly according to invention may provide wherein the secondary tubular seam filling device is configured to be wedged beneath the compost filter sock, whereby the compost filter sock provides a pinning force to the secondary tubular seam filling device. The compost filter sock may have a nominal diameter of 2-12 times a diameter of a tubular element of the secondary tubular seam filling device.

The composite filter sock assembly according to the invention may provide that the compost filter sock has a nominal diameter of 12"-36". The composite filter sock assembly according to invention may provide that the tubular element is at least partially filled with a swell-able material (which references herein a material that will expand with absorption of moisture) and wherein the tubular element is at least partially filled with sphagnum peat moss.

The composite filter sock assembly according to invention may provide that the tubular element is at least partially filled with a water treating additive. The composite filter sock assembly according to invention may provide wherein the tubular element is a degradable mesh material having a nominal diameter of 4"-5" and wherein it has a length of at least 100'. The composite filter sock assembly according to invention may provide that the tubular element includes fastening mechanism on an exterior surface configured to facilitate coupling to a mesh tube of a compost filter sock.

One aspect of the present invention provides a secondary tubular seam filling device comprising a tubular element with a nominal diameter of 3"-6" and having a length of at least 50' supported on a pallet. The secondary tubular seam filling device according to the invention may provide wherein the tubular element is at least partially filled with a swell-able material, and wherein the tubular element is at least partially filled with sphagnum peat moss. The secondary tubular seam filling device according to the invention may provide that the tubular element is at least partially filled with a water treating additive. The secondary tubular seam filling device according to the invention may provide that the tubular element is a degradable mesh material having a 4"-5" diameter and having a length of at least 100'. The secondary tubular seam filling device according to the invention may provide that the tubular element includes fastening mechanism on an exterior surface configured to facilitate coupling to a mesh tube of a compost filter sock.

One aspect of the present invention provides a method of forming a composite filter sock assembly comprising the steps of installing a compost filter sock, providing a secondary tubular seam filling device, and wedging a secondary tubular seam filling device beneath the compost filter sock, whereby the compost filter sock provides a pinning force to the secondary tubular seam filling device. The method of forming a composite filter sock assembly according to invention may provide wherein a tubular element of the secondary tubular seam filling device is at least partially filled with a swell-able material. The method of forming a composite filter sock assembly according to invention may provide wherein a tubular element of the secondary tubular seam filling device is at least partially filled with sphagnum peat moss. The method of forming a composite filter sock assembly according to the invention may provide wherein the compost filter sock has a nominal diameter of 2-12 times a diameter of a tubular element of the secondary tubular seam filling device. The method of forming a composite filter sock assembly according to invention may provide wherein the tubular element is a degradable mesh material having a 4"-5" diameter and having a length of at least 100'.

The features that characterize the present invention are pointed out with particularity in the claims which are part of this disclosure. These and other features of the invention, its operating advantages and the specific objects obtained by its use will be more fully understood from the following detailed description in connection with the attached figures.

DESCRIPTION OF THE PREFERRED EMBODIMENTS

Figure 1:
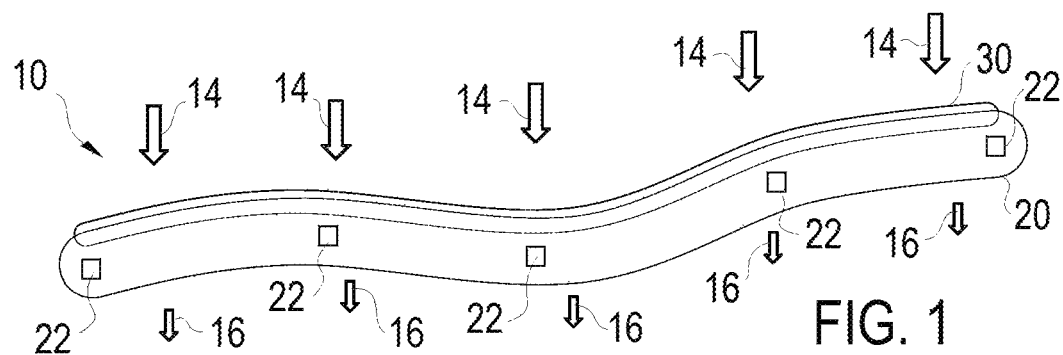
FIG. 1 is a schematic plan view of a composite filter sock assembly incorporating a compost filter sock and secondary tubular seam filling device according to one embodiment of the present invention.
Figure 2:
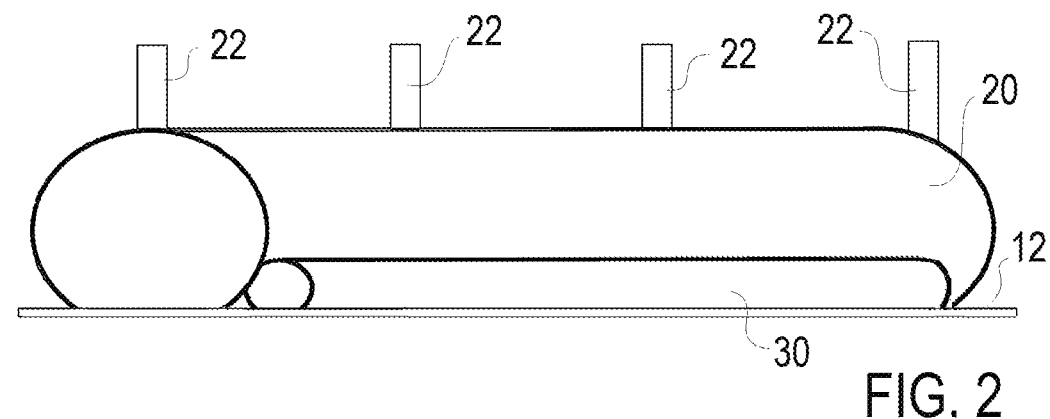
FIG. 2 is a schematic elevation view of a portion of the composite filter sock assembly according to FIG. 1 shown on level surface.
Figure 3:
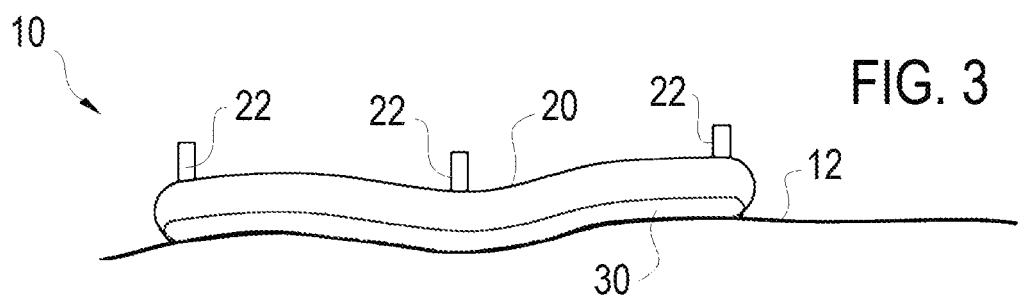
FIG. 3 is a schematic elevation view of a portion of the composite filter sock assembly according to FIG. 1.
Figure 4:
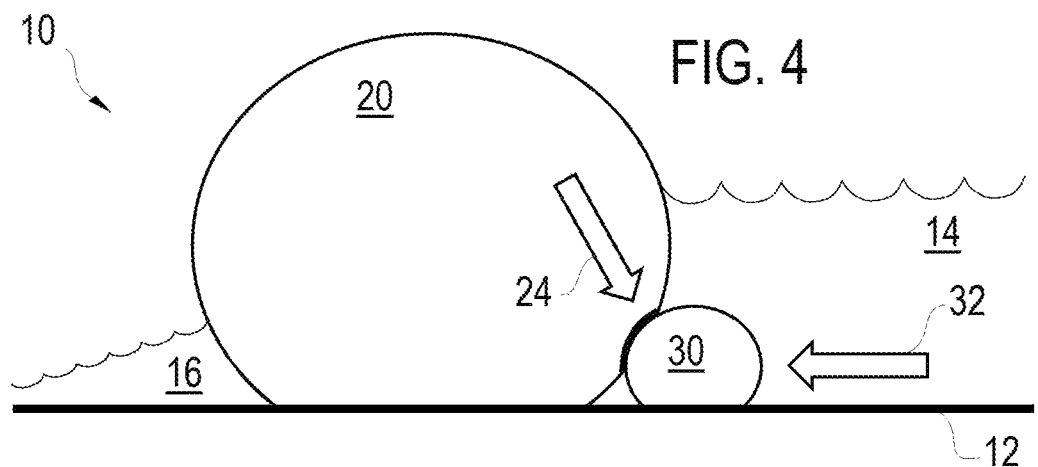
FIG. 4 is a schematic sectional view of the composite filter sock assembly according to FIG. 1.
Figure 5:
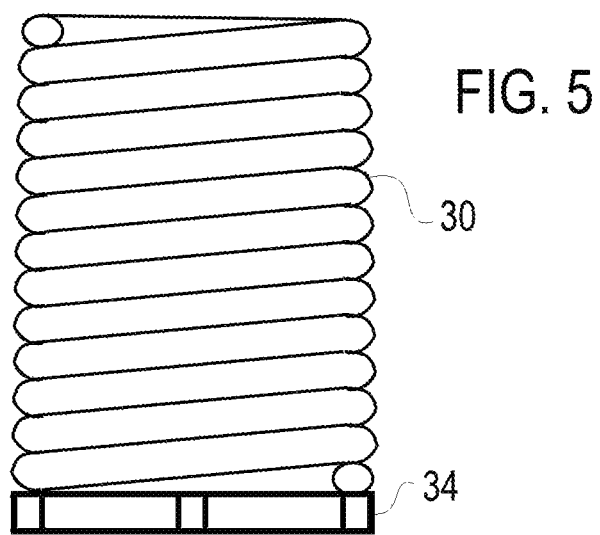
FIG. 5 is a schematic elevation view of a palletized secondary tubular seam filling device for use with the composite sock assembly of FIG. 1 according to one embodiment of the present invention

The present invention relates to a composite filter sock assembly 10 including a compost filter sock 20 and secondary tubular seam filling device 30 configured to be wedged beneath the compost filter sock, whereby the compost filter sock 20 provides a pinning force 24 to the secondary tubular seam filling device 30 as shown in detail in FIGS. 1-4.

The compost filer sock 20 can be any conventional commercially available compost filter sock. The compost filter sock 20 includes a netting sleeve material filled with filler.

The netting material of the compost filter sock 20, also called mesh tube, and is available from the applicant under the DIAMOND SOCK® brand. The netting sleeve material can come in any conventional size between about 12" and 36", most typically circular cross sections of 12", 18", 24" and 36" being the most common. Compost filter socks are formed less than 12" but the smaller sizes are not typically used in applications requiring seam filling. Thus the compost filter sock 20 has a nominal diameter of 12"-36".

The mesh opening size of the netting material of the compost filter sock 20 can be of a variety of conventional sizes, of typically ⅛-⅝", and preferably ⅛-⅜", provided that the mesh openings are small enough to maintain the filler within the constructed filter sock 20 and large enough to allow runoff water to flow there through easily. The mesh opening size for the netting material of the netting material of the compost filter sock 20 is significant because if the openings are too small, the compost filter sock 20 "blinds" (the openings become clogged or blocked); and if the openings are too big, the filler washes or falls out of the netting of the sock 20. The openings may be formed as a ⅛"-⅝" inch square, ⅛"-⅝" hex, or ⅛"-⅝" round. An elongated triangle for openings that are about ⅜" long, about 3/16" wide at the fat end tapering to about ⅛" at the narrow end are quite effective openings for filter netting for the compost filter sock 20. For precision it is noted that for round openings the linear measurement given is normally of the diameter, or largest diameter for an oval. Similarly the linear measurement is generally the diameter for hexagon shaped openings and anything higher order than a rectangle (octagon, heptagon, etc). For a rectangle or a triangle shaped opening the linear measurement is typically associated with a major or longest side.

The netting material is preferably formed of polyester or polypropylene or combinations thereof. Polyester and polypropylene netting materials are easily scalable and still allow the compost filter netting to satisfy the requirements of compost filter netting set by every state requirement. For example, the requirements of compost filter netting set by the Pennsylvania Department of Environmental Protection, as of 2015, includes minimum requirements of "5 mil HDPE" (high density polyethylene) netting to be photodegradable, to have 8"-32" diameters, minimum mesh openings of ⅜", minimum tensile strength of 26 PSI, exhibit Ultraviolet stability of at least 23% original strength at 1000 hours (ASTM g-155 test), and have a minimum functional longevity of at least nine months.

The compost filter sock 20 has the netting sleeve filled with filler material, generally compostable material. The filler material may include a biodegradable filling material may include ground or chipped wood based material from land clearing, yard waste, pallets and clean wood debris or clean wood scraps, for example, a common biodegradable filling material is wood chipped to between ½" and 2" in particle size. The filler material may include a biodegradable fiberous filling material such as straw (defined broadly herein as the dried stalk of a plant, including grain straws such as wheat straw, barley straw, oat straw, and rye straw), grasses (including prairie grasses), pine straw (AKA pine needles), corn stalks, natural fibers (such as flax, hemp, sisal, jute, kenaf, bamboo, coir, catgut, wool, alpaca hair, mohair, fique and rattan) and weeds and combinations thereof. The filler material can further include some amount of aggregate, generally added for weight, wherein aggregate typically refers to medium grained particulate material typically used in construction, including sand, gravel, crushed stone, slag, recycled concrete, geosynthetic aggregates, clay, pumice, perlite, vermiculite and combinations thereof.

The composite filter sock 20 is typically filled with a blower or an auger. For example a sleeve of netting material is placed on the outlet tube of the conveying auger or blower and a leading end of the netting material is pulled off of the outlet tube and sealed at by a tying mechanism or closing mechanism. Simply knotting the end is typically sufficient for forming the seal or closure, but bands, clips, fastener may be used as well. When a sufficient length of netting material has been filled with the filler material, then the proximal end will be sealed, generally in the same manner as the distal end. The sleeve of netting material may be cut so that multiple filtration socks 20 may be formed from one sleeve of netting material.

The secondary tubular seam filling device 30 includes a tubular element which may include a tubular element formed similar to the netting material of the composite filter sock 20. The Tubular Element is preferably formed as a degradable, photodegradable or biodegradable (such as with an oxi-degradable additive) mesh material having a 3"-6" nominal diameter, preferably a 4"-5" nominal diameter.

The Tubular Element of the secondary tubular seam filling device 30 may be filled with the material that fills the compost filter sock 12, however preferably the tubular element of the secondary tubular seam filling device 30 dry material for ease of shipping, such as at least partially filled with a swell-able material (meaning a material that swells when in contact with water) such as sphagnum peat moss.

The secondary tubular seam filling device 30 is not intended to form the primary filtering mechanism for the assembly 10 and thus there greater flexibility on the filling material for the secondary tubular seam filling device 30 than for the compost filter sock 20. For example the Tubular Element may be at least partially filled with a water treating additive.

The Composite Filter Sock Assembly 10 according to the invention may provide wherein the Tubular Element of the secondary tubular seam filling device 30 is a degradable mesh material, typically photodegradable or biodegradable, having a 3"-6" diameter, preferably 4"-5" Diameter Tubular Element having a length of at least 50', preferably at least 100' and is provided as a pallet product on a pallet 34 for easy shipping.

The Composite Filter Sock Assembly 10 according to invention provides that the compost filter sock 20 has a nominal diameter of 2-12 times a diameter of a tubular element of the Secondary Tubular Seam Filling Device 30, wherein the compost filter sock 10 has a nominal diameter of 12"-36" and wherein the Tubular Element of the Secondary Tubular Seam Filling Device 30 is a degradable mesh material having a 3"-6" diameter, preferably a 4"-5" Diameter.

The Composite Filter Sock Assembly 10 according to invention wherein the Tubular Element of secondary Tubular Seam Filling Device 30 includes fastening mechanism such as velcro or the like on an exterior surface configured to facilitate coupling to a mesh tube of the Tubular Seam Filling Device 30 of a compost filter sock 20.

The method of installation of a Composite Filter Sock Assembly 10 comprises the steps of first installing a Compost Filter Sock 10 on the ground 12 with stakes 22 through the sock 10 in a conventional fashion. Additional stakes 22 may be provided as back up stakes opposite the Runoff Water 14 side of the assembly 10 and adjacent the sock 10 on the filtered water 16 side of the assembly 10.

The next steps of the installation method of the assembly 10 is providing a Secondary Tubular Seam Filling Device 20 and wedging the Secondary Tubular Seam Filling Device 20 beneath the compost filter sock 10 through application of a wedging force 32 against the device 20. Wedging with mean, within this application, that a portion of the device is engaged directly with the sock 20 below the midline of the sock 20 and whereby the compost filter sock 20 provides a pinning pressure 24 to the Secondary Tubular Seam Filling Device 30. The pinning pressure increases as the sock 20 settles and if the Secondary Tubular Seam Filling Device 30 is at least partially filled with a swell-able material, such as sphagnum peat moss. In other words the swelling of the material filling the tubular element of the secondary tubular seam filling device will enhance the pinning force that acts to hold the device 30 in position.

The assembly 10 is much more easily installed than a 12-36" conventional sock with traditional seam filling. Further the design tends to keep the device 30 with the sock 20, and if there is a separation between the sock 20 and the device 30, there is a rapid "resealing" operation that can consist of the operator merely "kicking" the device 30 back in place. Any resealing that is required is easily accomplished during the visual inspection of the assembly 10, such as is common after significant rain events.

While the invention has been shown in several particular embodiments it should be clear that various modifications may be made to the present invention without departing from the spirit and scope thereof. The scope of the present invention is defined by the appended claims and equivalents thereto.

What is claimed is:

1. A Composite Filter Sock Assembly comprising a Compost Filter Sock and a Secondary Tubular Seam Filling Device wherein the Secondary Tubular Seam Filling Device is wedged beneath the compost filter sock, whereby the compost filter sock provides a pinning pressure to the Secondary Tubular Seam Filling Device, wherein the compost filter sock has a nominal diameter of 2-12 times a nominal diameter of a tubular element of the Secondary Tubular Seam Filling Device, and wherein the compost filter sock has a nominal diameter of 12"-36", and wherein the secondary tubular seam filling device is separate from the compost filter sock during installation to facilitate wedging the Secondary Tubular Seam Filling Device beneath the compost filter sock and to facilitate the provision of the pinning pressure to the Secondary Tubular Seam Filling Device.

2. A Composite Filter Sock Assembly comprising a Compost Filter Sock and a Secondary Tubular Seam Filling Device wherein the Secondary Tubular Seam Filling Device is wedged beneath the compost filter sock, whereby the compost filter sock provides a pinning pressure to the Secondary Tubular Seam Filling Device, wherein the compost filter sock has a nominal diameter of 2-12 times a nominal diameter of a tubular element of the Secondary Tubular Seam Filling Device, and wherein the Tubular Element is a degradable mesh material having a nominal diameter of 4"-5" and having a length of at least 100', and wherein the secondary tubular seam filling device is separate from the compost filter sock during installation to facilitate wedging the Secondary Tubular Seam Filling Device beneath the compost filter sock and to facilitate the provision of the pinning pressure to the Secondary Tubular Seam Filling Device.

3. A method of forming a Composite Filter Sock Assembly comprising the steps of
   installing a Compost Filter Sock on ground surface;
   providing Secondary Tubular Seam Filling Device; and
   wedging the Secondary Tubular Seam Filling Device beneath the compost filter sock, whereby the compost filter sock provides a pinning pressure to the Secondary Tubular Seam Filling Device, wherein the compost filter sock has a nominal diameter of 2-12 times a diameter of a tubular element of the Secondary Tubular Seam Filling Device, and wherein the secondary tubular seam filling device is separate from the compost filter sock during installation to facilitate wedging the Secondary Tubular Seam Filling Device beneath the compost filter sock and to facilitate the provision of the pinning pressure to the Secondary Tubular Seam Filling Device.

4. The method of forming a Composite Filter Sock Assembly according to claim 3 wherein the Tubular Element is a degradable mesh material having a 4"-5" Diameter having a length of at least 100'.

\* \* \* \* \*